United States Patent
Kroenke-Hille et al.

(10) Patent No.: US 12,433,558 B2
(45) Date of Patent: Oct. 7, 2025

(54) PERFUSION ANALYSIS

(71) Applicant: KONINKLIJKE PHILIPS N.V., Eindhoven (NL)

(72) Inventors: Sven Kroenke-Hille, Hamburg (DE); Tobias Wissel, Lübeck (DE); Gerhardus Wilhelmus Lucassen, Eindhoven (NL); Rieko Verhagen, Vught (NL); Marc Godfriedus Marie Notten, Elsloo (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/715,768

(22) PCT Filed: Nov. 28, 2022

(86) PCT No.: PCT/EP2022/083385
§ 371 (c)(1),
(2) Date: Jun. 3, 2024

(87) PCT Pub. No.: WO2023/099365
PCT Pub. Date: Jun. 8, 2023

(65) Prior Publication Data
US 2025/0032080 A1    Jan. 30, 2025

(30) Foreign Application Priority Data
Dec. 3, 2021  (EP) .................................... 21212144

(51) Int. Cl.
*A61B 6/50* (2024.01)
*A61B 6/00* (2024.01)
(Continued)

(52) U.S. Cl.
CPC ............ *A61B 6/507* (2013.01); *A61B 6/4417* (2013.01); *A61B 6/461* (2013.01); *A61B 6/481* (2013.01);
(Continued)

(58) Field of Classification Search
CPC ....... A61B 6/507; A61B 6/4417; A61B 6/461; A61B 6/481; A61B 6/504; A61B 6/5247; A61B 6/582
See application file for complete search history.

(56) References Cited

U.S. PATENT DOCUMENTS

| | | |
|---|---|---|
| 8,483,796 B2 | 7/2013 | Nahm |
| 9,750,575 B2 | 9/2017 | Elhawary et al. |

(Continued)

FOREIGN PATENT DOCUMENTS

| | | |
|---|---|---|
| CN | 105748029 A | 7/2016 |
| EP | 3808275 A1 | 4/2021 |

(Continued)

OTHER PUBLICATIONS

Tendera et al., "ESC Guidelines on the diagnosis and treatment of peripheral artery diseases", European Heart Journal, (2011), 32, pp. 2851-2906.

(Continued)

*Primary Examiner* — Sean A Frith (57) ABSTRACT

The present invention relates to perfusion analysis. In order to provide a facilitated way of achieving and providing perfusion analysis, a device (10) for perfusion analysis is provided that comprises a data input (12), a data processor (14) and an output interface (16). The data input is configured to provide X-ray based 2D angiographic image data as first image data of a region of interest of a subject; wherein the first image data comprises information about a distribution of contrast agent in tissue areas of the region of interest being indicative for perfusion; and to provide 2D optical perfusion measurement image data as second image data of a surface layer of a flat part of the region of interest of the subject; wherein the second image data comprises information about blood related properties of blood present within the surface layer of the flat part of the region of interest. The data processor is configured to register the first image data and the second image data; and to transfer perfusion related image content from the second image data to the first image data, generating enhanced first image data. The output interface is configured to provide the enhanced first image data.

20 Claims, 4 Drawing Sheets

(51) Int. Cl.
  *A61B 6/46* (2024.01)
  *A61B 6/58* (2024.01)
(52) U.S. Cl.
  CPC ............ *A61B 6/504* (2013.01); *A61B 6/5247* (2013.01); *A61B 6/582* (2013.01)

(56) References Cited

U.S. PATENT DOCUMENTS

| | | | | |
|---|---|---|---|---|
| 2012/0190967 | A1* | 7/2012 | Nahm | A61B 6/548 600/479 |
| 2024/0070867 | A1 | 2/2024 | Krönke et al. | |

FOREIGN PATENT DOCUMENTS

| | | |
|---|---|---|
| JP | 2013192834 A | 9/2013 |
| WO | 2023186775 A1 | 10/2023 |

OTHER PUBLICATIONS www.pedratech.com, downloaded May 31, 2024.
Heeman et al., "Clinical applications of laser speckle contrast imaging: a review", Journal of Biomedical Optics, vol. 24 Issue 08, p. 1, (2019), pp. 080901-1-11.
www.hypermed.com, downloaded on May 31, 2024.
Konstas et al., "Theoretic Basis and Technical Implementations of CT Perfusion in Acute Ischemic Stroke, Part 1: Theoretic Basis", American Journal of Neuroradiology, 2009, 30(4), pp. 662-668.
Fagrell et al., "Relative hematocrit in human skin capillaries and its relation to capillary blood flow velocity", Microvascular Research, 1980, 20, pp. 327-335, (abstract).
International Search report and Written Opinion of PCT/EP2022/083385, dated Feb. 24, 2023.

* cited by examiner

PERFUSION ANALYSIS

CROSS-REFERENCE TO PRIOR APPLICATIONS

This application is the U.S. National Phase application under 35 U.S.C. § 371 of International Application No. PCT/EP2022/083385, filed on Nov. 28, 2022, which claims the benefit of European Patent Application No. 21212144.6, filed on Dec. 3, 2021. These applications are hereby incorporated by reference herein.

FIELD OF THE INVENTION

The present invention relates to a device for perfusion analysis, to a medical imaging system and to a method for perfusion analysis.

BACKGROUND OF THE INVENTION

As an example for peripheral arterial diseases (PAD), atherosclerosis in the peripheral arteries is a chronic slowly developing condition causing narrowing of the arteries. Depending on the degree of narrowing, various symptoms may occur with many patients developing acute events associated with thrombosis and/or embolism and occlusion of a major artery. Clinical methods to diagnose PAD are based on blood pressure measurements like ankle brachial index (ABI), toe brachial index (TBI) and toe pressure (TP) which measure ratios of blood pressures at ankle or toe and the arm. As a further example of detecting PAD is transcutaneous oxygen tension (Tcp02) measurements to get oxygen tension values after heating tissue. These Tcp02 measurements are cumbersome and also not very reliable. Another example is to measure peripheral perfusion and or tissue oxygenation by using optical illumination either with contact probes, i.e. laser doppler imaging, speckle contrast imaging or non-contact imaging methods using a camera, e.g. imaging photoplethysmography (iPPG), laser speckle imaging (LSI) or multi/hyperspectral imaging (MSI/HSI).

SUMMARY OF THE INVENTION

There may thus be a need to provide a facilitated way of achieving and providing perfusion analysis.

The object of the present invention is solved by the subject-matter of the independent claims; further embodiments are incorporated in the dependent claims. It should be noted that the following described aspects of the invention apply also for the device for perfusion analysis, for the medical imaging system and for the method for perfusion analysis.

According to the present invention, a device for perfusion analysis is provided. The device comprises a data input, a data processor and an output interface. The data input is configured to provide X-ray based 2D angiographic image data as first image data of a region of interest of a subject. The first image data comprises information about a distribution of contrast agent in tissue areas of the region of interest being indicative for perfusion. The data input is also configured to provide 2D optical perfusion measurement image data as second image data of a surface layer of a flat part of the region of interest of the subject. The second image data comprises information about blood related properties of blood present within the surface layer of the flat part of the region of interest. The data processor is configured to register the first image data and the second image data. The data processor is also configured to transfer perfusion related image content from the second image data to the first image data, generating enhanced first image data. The output interface is configured to provide the enhanced first image data.

As an effect, combined image data is made available providing enhanced information within the context of the first image data, i.e. the 2D angiograms. The user is thus provided with more information which means a facilitated workflow.

Hence, it can be said that the first image data comprises information about a first set of perfusion properties and the second image data comprises information about a second set of perfusion properties. The first set of perfusion properties can also be referred to as set of first perfusion properties or as first set of first perfusion properties. The second set of perfusion properties can also be referred to as set of second perfusion properties or as second set of second perfusion properties.

According to an example, the second image data is image data of a surface layer of a flat part of the region of interest. For the transfer, the data processor is configured to identify the flat part of the region of interest in the first image data. The data processor is also configured to determine a reference location within the identified flat part in the first image data. The data processor is further configured to project the reference location from the first image data into the second image data identifying a corresponding reference line within the second image data. For the projection, a path of an X-ray radiation for the reference location in the first image data is traced and projected into the second image data as the corresponding reference line. Further, the data processor is configured to determine image values along the corresponding reference line within the second image data, to generate a reference value. The data processor is furthermore configured to transfer the reference value to the reference location within the identified flat part in the first image data.

In an example, the angiographic image data refers to a digital subtraction angiography (DSA) maximum-intensity projection (MIP). In the following, the digital subtraction angiography maximum-intensity projection is also referred to as DSA MIP.

According to an example, the reference location within the identified flat part in the first image data is a calibration location. The data processor is configured to sum up the maximum intensity projection of the angiographic image data for the calibration location in the first image data, to generate a first calibration value. The data processor is also configured to sum up the signal of the perfusion measurement for the identified reference line, to generate a second calibration value. The first and second calibration values are provided for calibration of the first image data. Preferably, the perfusion parameter is provided as at least one of the group of blood-volume and hemoglobin content.

According to an example, the region of interest is a foot and the flat part of the region of interest is the sole. The data processor is configured to localize the sole in the angiography. The data processor is also configured to determine the calibration region as a thin layer in the foot. The thickness of this layer corresponds to a penetration depth of the optical imaging. The data processor is further configured to sum up the DSA MIP signal in the calibration region in the viewing direction of the optical imaging system projected to the first image data via ray-tracing. The data processor is configured to assign the result to the corresponding sole surface pixel.

According to an example, the reference location within the identified flat part in the first image data is an enrichment location. The data processor is configured to sum up the signal of the perfusion measurement for the identified reference line, to generate a blood content value. The data processor is also configured to overlay the blood content value to the first image data.

According to an example, the region of interest is a foot and the flat part of the region of interest is the sole. The data processor is configured to identify the sole in the angiography. The data processor is configured to estimate, for each position on the sole, the corresponding ray of the X-ray beam. The data processor is configured to use the mutual pose estimation of both modalities, to project this ray on a spectral map of the sole. The data processor is configured to reconstruct the oxygenation from the spectral map. The data processor is configured to generate a predetermined type of an oxygenation value along this projected X-ray. The data processor is configured to assign the resulting oxygenation value to the considered position of the sole in the angiography. The data processor is configured to map the oxygenation measurement into the angiography. The output interface is configured to present the oxygenation measurement as an overlay on the DSA frames or the DSA MIP.

According to an example, the first image data is acquired in a first direction in relation to the region of interest; the second image data is acquired in a second direction in relation to the region of interest. The first and the second direction are approximately orthogonal to each other.

According to the present invention, also a medical imaging system is provided. The system comprises an angiography imaging device and an optical perfusion measurement device. Further, an example of the device for perfusion analysis according to one of the preceding examples is provided. The angiography imaging device is configured for generation of X-ray images of a region of interest of a subject, wherein the X-ray images comprise contrast-injected images and non-injected images. The optical perfusion measurement device is configured for generation of optical perfusion measurements of the region of interest of the subject. The X-ray imaging device is configured to acquire X-ray images for generating the X-ray based 2D angiographic image data. The optical perfusion imaging device is configured to acquire images for generating the 2D optical perfusion measurement image data.

According to the present invention, also a method for perfusion analysis is provided. The method comprises the following steps:
providing X-ray based 2D angiographic image data as first image data of a region of interest of a subject; the first image data comprises information about a distribution of contrast agent in tissue areas of the region of interest being indicative for perfusion;
providing 2D optical perfusion measurement image data as second image data of a surface layer of a flat part of the region of interest of the subject; the second image data comprises information about blood related properties of blood present within the surface layer of the flat part of the region of interest;
registering the first image data and the second image data; and
transferring perfusion related image content from the second image data to the first image data, generating enhanced first image data.

According to an aspect, it is proposed to combine both imaging modalities of 2D angiography and optical perfusion measurements in a stereo-imaging configuration for processing and analyzing the angiography based on optical perfusion measurements. As an example, 2D angiography is provided to be readily available in the catheter-laboratory. Optical perfusion measurements are useful, for example for assessing interventions treating peripheral arterial diseases and corresponding patient monitoring. As an effect, the complementary properties and different advantages and disadvantages regarding e.g. penetration depth and chemical sensitivity of the two modalities are combined.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

Figure 1:
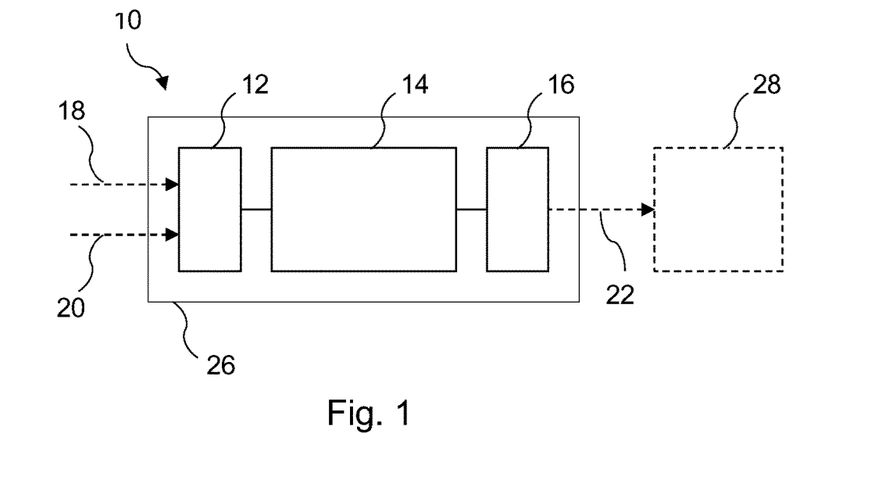
FIG. 1 schematically shows an example of a device for perfusion analysis.

FIG. 1 schematically shows an example of a device 10 for perfusion analysis. The device 10 comprises a data input 12, a data processor 14 and an output interface 16. The data input 12 is configured to provide X-ray based 2D angiographic image data as first image data of a region of interest of a subject. The first image data comprises information about a distribution of contrast agent in tissue areas of the region of interest being indicative for perfusion. The data input 12 is also configured to provide 2D optical perfusion measurement image data as second image data of a surface layer of a flat part of the region of interest of the subject. The second image data comprises information about blood related properties of blood present within the surface layer of the flat part, or flat portion, of the region of interest. The data processor 14 is configured to register the first image data and the second image data. The data processor 14 is also configured to transfer perfusion related image content from the second image data to the first image data, generating enhanced first image data. The output interface 16 is configured to provide the enhanced first image data.

The data input 12 provides the 2D angiographic image data and the 2D optical perfusion measurement image data to the data processor. Both types of data, i.e. the 2D angiographic image data and the 2D optical perfusion measurement image data are generated by respective imaging appliances. The data input 12 so-to-speak supplies the data, i.e. feeds the data to the data processor. The image data generated by the respective imaging sources can be transferred directly or indirectly to the data input 12. For example, the image data can be stored on a data storage and then forwarded to the data input 12.

A first input arrow 18 indicates the provision of the 2D angiographic image data as the first image data. A second input arrow 20 indicates the provision of the 2D optical perfusion measurement image data as the second image data.

An output arrow 22 indicates the provision of the enhanced first image data.

The data input 12, the data processor 14 and the output interface 16 can be provided within a common structure, like a housing, indicated with a frame 26, or as separately arranged components.

The data input 12 can also be referred to as data input module. The data processor 14 can also be referred to as data processing module. The output interface 16 can also be referred to as output interface module. The data input 12 can also be referred to as data supply, as image supply, as image data supply, as input unit or simply as input.

In an example, the data input 12 is data-connectable to an imaging source arrangement like an X-ray system, e.g. a C-arm or a CT imaging system, providing contrast-injected 2D X-ray images for the angiographic image data of the subject.

In an example, the data input 12 is data-connectable to an imaging source arrangement like an optical perfusion imaging device, providing the 2D optical perfusion measurement image data.

In an example, the image data 12 input is data-connectable to a data storage having stored the image data.

The data processor 14 can also be referred to as data processing arrangement, as processor unit or as processor. In an example, the data processor 14 is data-connected to the image data input 12 and the output interface 16.

The output interface 16 can also be referred to as output or output unit. In an example, the output interface 16 is data-connectable to a display arrangement or display device. In another example, the output interface 16 is data-connected to a display.

In an example, the input and the output are provided as graphical user interface (GUI). The information about the distribution of contrast agent in tissue areas of the region of interest is indicative for perfusion. The information about the distribution of contrast agent in tissue areas of the region of interest is also indicative for blood volume. The information about the distribution of contrast agent in tissue areas of the region of interest thus provides information about blood flow in the region of interest.

In an example, the information about the distribution of contrast agent in tissue areas of the region of interest relates to a static degree of perfusion. In a further example, the information about the distribution of contrast agent in tissue areas of the region of interest relates to a dynamic degree of perfusion.

The data input is configured to provide the 2D angiographic image data based on X-ray imaging.

As an option, the data input is configured to provide the 2D angiographic image data based on magnetic resonance imaging (MRI).

In an example, shown as an option in FIG. 1, a display 28 is provided. The display 28 is configured to display the enhanced first image data.

In an example, not further shown in detail, the second image data is image data of a surface layer of a flat part of the region of interest. For the transfer, the data processor 14 is configured to: identify the flat part of the region of interest in the first image data; to determine a reference location within the identified flat part in the first image data; and project the reference location from the first image data into the second image data identifying a corresponding reference line within the second image data. For the projection, a path of an X-ray radiation for the reference location in the first image data is traced and projected into the second image data as the corresponding reference line. The data processor 14 is configured to determine image values along the corresponding reference line within the second image data, and to generate a reference value. The data processor 14 is configured to transfer the reference value to the reference location within the identified flat part in the first image data.

In an example, not shown in detail, the reference location within the identified flat part in the first image data is a calibration location. The data processor 14 is configured to sum up the maximum intensity projection of the angiographic image data for the calibration location in the first image data, to generate a first calibration value. The data processor 14 is also configured to sum up the signal of the perfusion measurement for the identified reference line, to generate a second calibration value. The first and second calibration values are provided for calibration of the first image data.

As an option, the perfusion parameter is provided as at least one of the group of blood-volume and hemoglobin content.

The maximum intensity projection thus provides a signal within the angiographic image data. The maximum intensity projection is provided as maximum intensity projection of the digital subtraction angiography frames over time.

In an example, to generate the first calibration value, the data processor 14 is configured to sum up the signal of the angiographic image data for the calibration location in the first image data.

In an example, the blood-volume is provided in absolute units.

In an example, the hemoglobin content is provided under some assumptions as an estimate. In an example, the hemoglobin content is provided in volume.

In an example, not shown in detail, the region of interest is a foot and the flat part of the region of interest is the sole. The data processor 14 is configured to localize the sole in the angiography, and to determine the calibration region as a thin layer in the foot. The thickness of this layer corresponds to a penetration depth of the optical imaging. The data processor 14 is also configured to sum up the DSA MIP signal in the calibration region in the viewing direction of the optical imaging system projected to the first image data via ray-tracing. The data processor 14 is further configured to assign the result to the corresponding sole surface pixel.

In an example, the data processor 14 is configured to sum up the DSA MIP signal in the calibration region in the direction essentially orthogonal to the sole.

In an example, the reference location within the identified flat part in the first image data is an enrichment location. The data processor 14 is configured to sum up the signal of the perfusion measurement for the identified reference line, and to generate a blood content value. The data processor 14 is also configured to overlay the blood content value to the first image data.

In an example, the blood content value is overlaid to the first image data in an enrichment location.

In an example, not further shown in detail, the region of interest is a foot and the flat part of the region of interest is the sole. The data processor 14 is configured to: identify the sole in the angiography; estimate, for each position on the sole, the corresponding ray of the X-ray beam; use the mutual pose estimation of both modalities, to project this ray on a spectral map of the sole; reconstruct the oxygenation from the spectral map; generate a predetermined type of an oxygenation value along this projected X-ray; assign the resulting oxygenation value to the considered position of the sole in the angiography; and map the oxygenation measurement into the angiography. The output interface 16 is configured to present the oxygenation measurement as an overlay on the DSA frames or the DSA MIP.

The term "mutual pose estimation" refers to estimating a geometric relation of the two imaging modalities, i.e. their position and orientation relative to each other. In an example, the mutual pose estimation comprises a registration of the two imaging modalities to each other.

In an example, multi-spectral imaging is provided, and the ray is projected onto a multi-spectral map of the sole.

In an example, hyperspectral imaging is provided, and the ray is projected onto a hyperspectral map of the sole, e.g. an iPPG map of the sole.

In an example, the predetermined type of the oxygenation value is an average of the oxygenation along the projected X-ray.

In another example, the predetermined type of the oxygenation value is a median oxygenation along the projected X-ray.

In an example, not shown in detail, for registration of the first image data and the second image data, the data processor 14 is configured to provide to track a relative spatial position and relative orientation of the angiography imaging device and the optical perfusion measurement device.

In an example, not shown in detail, the first image data is acquired in a first direction in relation to the region of interest; and the second image data is acquired in a second direction in relation to the region of interest. The first and the second direction are approximately orthogonal to each other.

In an example, not shown in detail, the region of interest of the subject belongs to at least a foot or a hand of a subject. The data processor 14 is configured to choose the flat part of the region of interest as one of the group of sole of a foot, palm of a hand and dorsum of a hand.

In an example, not shown in detail, the data processor 14 is configured to map a skin oxygenation estimate, obtained from the optical measurement, into the 2D angiographic image data. The data processor 14 is also configured to correlate the skin oxygenation estimate with the perfusion in the depth.

Figure 2:
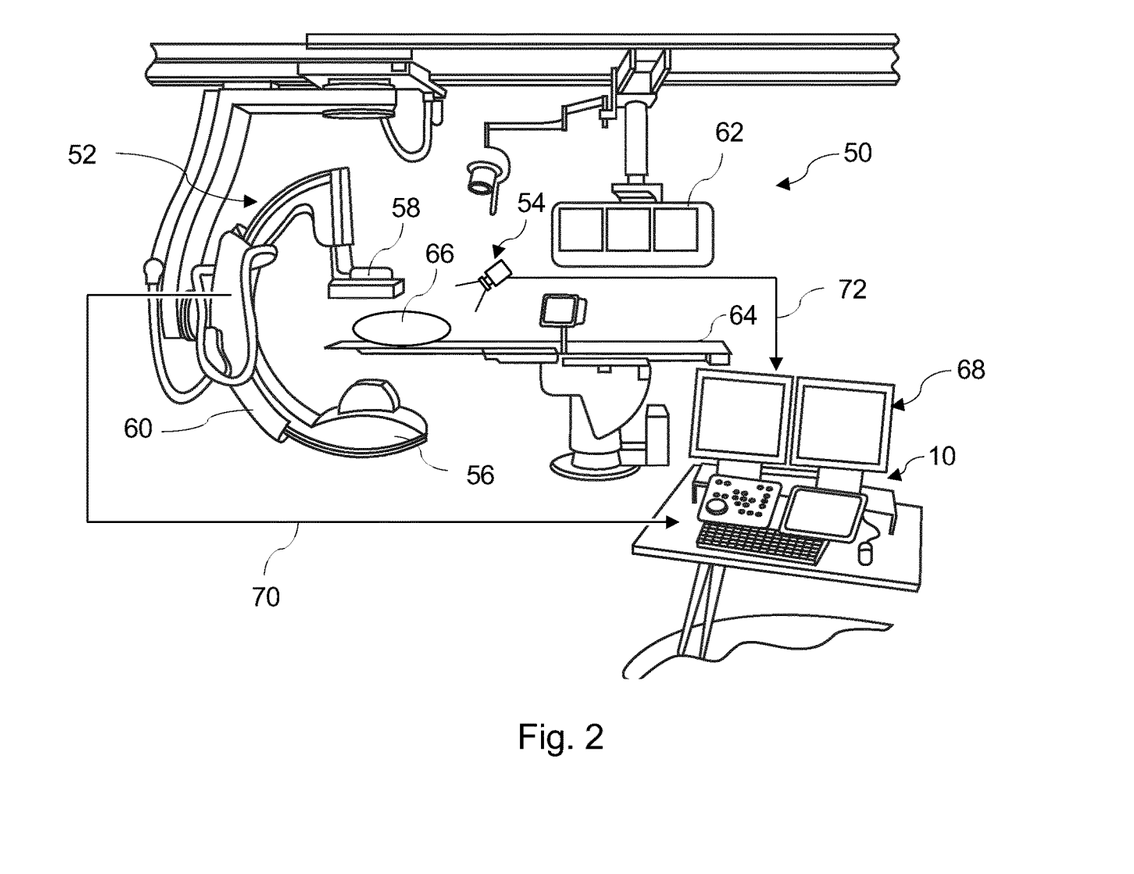
FIG. 2 shows an example of a medical imaging system.

FIG. 2 shows an example of a medical imaging system 50. The medical imaging system 50 comprises an angiography imaging device 52 configured for generation of X-ray images of a region of interest of a subject, wherein the X-ray images comprise contrast-injected images and non-injected images. In addition or alternatively, the medical imaging system 50 comprises an optical perfusion measurement device 54 configured for generation of optical perfusion measurements of the region of interest of the subject. Further, an example of the device 10 for perfusion analysis according to one of the preceding examples is provided. The X-ray imaging device 52 is configured to acquire X-ray images for generating the X-ray based 2D angiographic image data. The optical perfusion imaging device 54 is configured to acquire images for generating the 2D optical perfusion measurement image data. Further, as an option, the angiography imaging device 52 is provided in combination with the optical perfusion measurement device 54.

As an example, the medical imaging system 50 is shown in the context of an operation room in a hospital, e.g. a cath lab. The X-ray imaging device 52 is shown as a C-arm device with an X-ray source 56 and an X-ray detector 58 mounted to opposite ends of a movably supported C-arm 60. For example, a ceiling mounted rail system is provided for suspending the C-arm. Further, a monitor arrangement 62 is indicated plus lighting equipment. A subject support 64, e.g. a table, is provided for arranging a subject 66 for X-ray imaging. A console 68 is shown in the foreground providing control of the operation of the medical imaging system 50. In an example, the console 68 comprises the example of the device 10 for peripheral perfusion analysis (not further shown in FIG. 2). A first data connection line 70 indicates the provision of 2D X-ray images from the X-ray imaging device 52 to the console 68, i.e. the device 10 for peripheral perfusion analysis. A second data connection line 72 indicates the provision of optical perfusion measurements.

In an example, the optical perfusion measurement device is provided as a spectral imaging device.

In an example, the optical perfusion measurement device is provided as a hyper- or multispectral iPPG with structured light. A post-processing unit maps the measured signal, e.g. diffuse reflectance spectrum, to hemodynamic parameters, e.g. oxygen saturation.

In an example, the angiography imaging device, e.g. a C-arm, is provided in stereo configuration with respect to the optical imaging system, with known or measurable relative positioning/orientation, using e.g. senor hardware or by pose-estimation using the acquired images.

The device for perfusion analysis is also referred to as analysis module with user interface.

In an example, the device for perfusion analysis establishes spatial correspondences between the modalities, configures image processing algorithms of the angiography conditioned on the optical perfusion measurements, applies these algorithms and outputs the results, e.g. in form of output image data, and derivatives thereof or in a graphical user interface (GUI).

Figure 3:
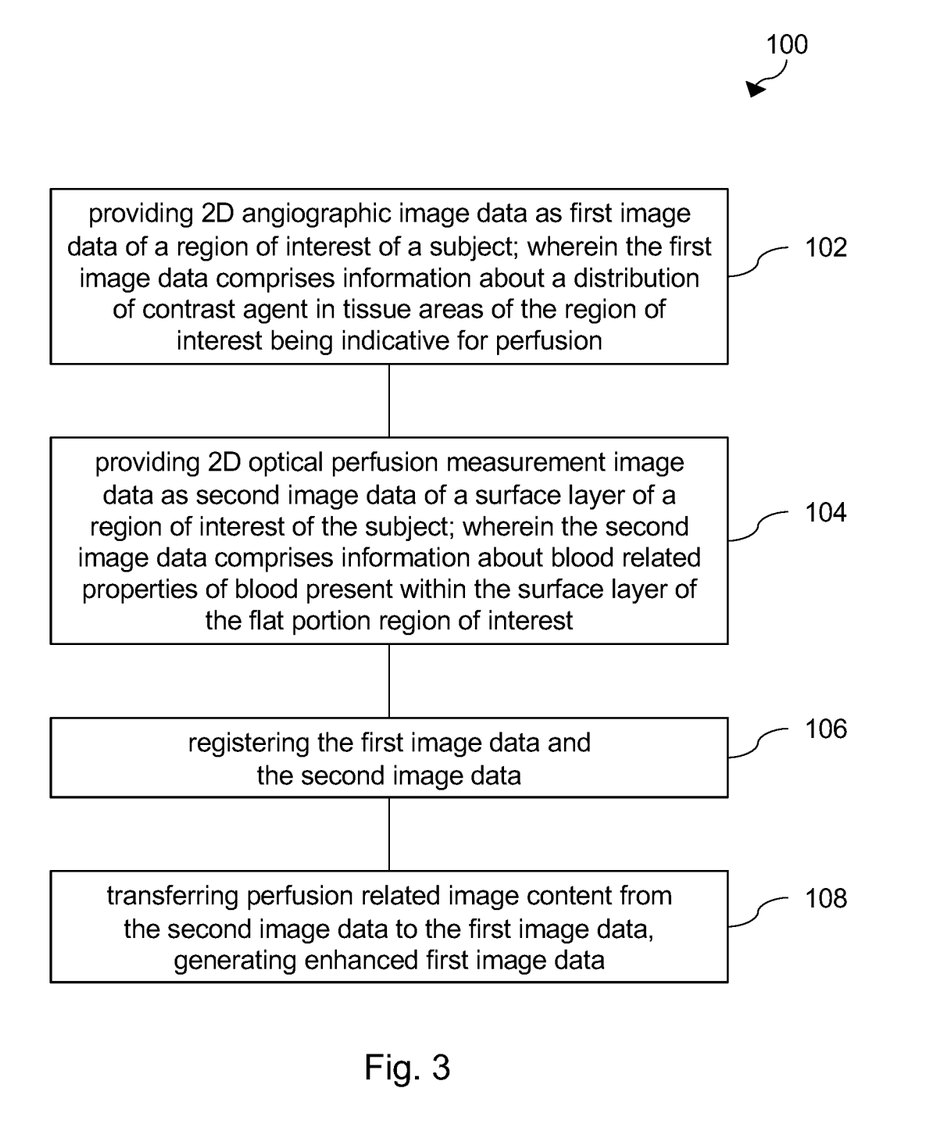
FIG. 3 shows steps of an example of a method for perfusion analysis.

FIG. 3 shows steps of an example of a method 100 for perfusion analysis. The method 100 comprises the following steps:

In a first step 102, X-ray based 2D angiographic image data is provided as first image data of a region of interest of a subject. The first image data comprises information about a distribution of contrast agent in tissue areas of the region of interest being indicative for perfusion.

In a second step 104, 2D optical perfusion measurement image data is provided as second image data of a surface layer of a flat part of the region of interest of the subject. The second image data comprises information about blood related properties of blood present within the surface layer of the flat part of the region of interest.

In a third step 106, the first image data and the second image data are registered.

In a fourth step 108, perfusion related image content is transferred from the second image data to the first image data, generating enhanced first image data.

In an example of the method 100, the second image data is image data of a surface layer of a flat part of the region of interest. For the transferring, the following is provided:

identifying the flat part of the region of interest in the first image data;

determining a reference location within the identified flat part in the first image data; and projecting the reference location from the first image data into the second image data identifying a corresponding reference line within the second image data. For the projecting, a path of an X-ray radiation for the reference location in the first image data is traced and projected into the second image data as the corresponding reference line.

It is further provided the steps of:

determining image values along the corresponding reference line within the second image data, generating a reference value: and transferring the reference value to the reference location within the identified flat part in the first image data.

The term "providing" 2D angiographic image data and 2D optical perfusion measurement image data refers to providing the data to the data processing steps. Both types of data, i.e. the 2D angiographic image data and the 2D optical perfusion measurement image data are generated by respective imaging appliances. The term "providing" is thus used in the sense of supplying the data.

Figure 4A:
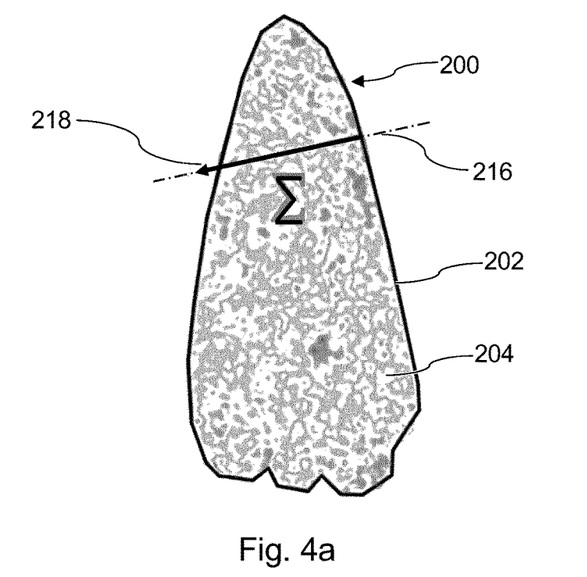
FIG. 4a and FIG. 4b show a first example of perfusion analysis yielding a calibration.

FIG. 4a shows an example of an illustration of 2D optical perfusion measurement image data 200, as second image data, of a surface layer of a region of interest of the subject, for example of a foot 202. In the example, a sole 204 of the foot 202 is schematically shown. The second image data, i.e. the 2D optical perfusion measurement image data 200, comprises information about blood related properties of blood present within the surface layer of the flat part of the region of interest.

Figure 4B:
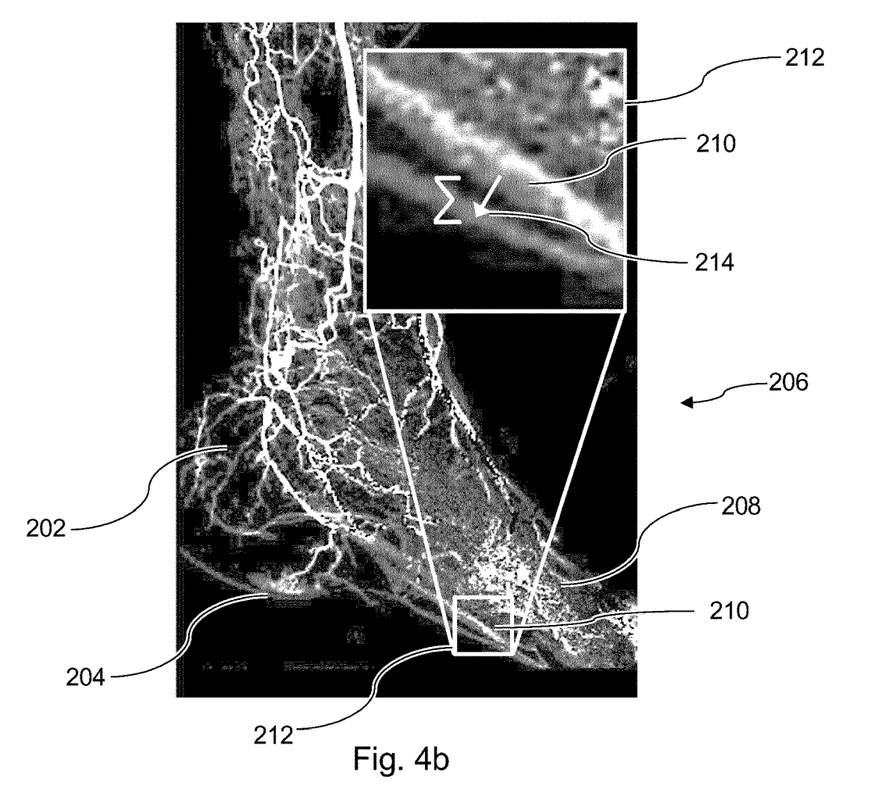

FIG. 4b shows an example of an illustration of 2D angiographic image data 206, as first image data, of the region of interest of the subject, for example of the foot 202. In the example, a side view of the foot 202 is schematically shown, with the sole 204 being arranged in the lower left section. The first image data, i.e. the 2D angiographic image data 206, comprises information about a distribution of contrast agent in tissue areas 208 of the region of interest, e.g, the foot 202, the distribution of contrast agent being indicative for perfusion.

A calibration location 210 is chosen, i.e. determined, in the first image data, i.e. in the 2D angiographic image data 206. The calibration location 210 is chosen to be arranged within the surface layer that is also shown in the 2D optical perfusion measurement image data 200, i.e. in the second image data. In FIG. 4b, the calibration location 210 is arranged in the sole 204. A square 212 marks the area of the calibration location 210, which is also shown enlarged, i.e. zoomed-in, in the upper right part of FIG. 4a.

A first arrow 214 is shown in the enlarged version of the square 212. The first arrow 214 indicates a summing up of a maximum intensity projection of the 2D angiographic image data for the calibration location 210 in the first image data, to generate a first calibration value. In an example, the first calibration value can provide a corresponding DSA MIP value. The summing up of the maximum intensity projection of the 2D angiographic image data is also indicated with a symbol Σ next to the first arrow 214.

The calibration location 210 is then projected from the 2D angiographic image data 206, i.e. from the first image data, into the 2D optical perfusion measurement image data 200, i.e. into the second image data, identifying a corresponding reference line 216 within the second image data. For projection, a path of an X-ray radiation for the reference location in the first image data is traced and projected into the second image data as the corresponding reference line.

A second arrow 218, indicating a summing up of a signal of the perfusion measurement for the identified reference line 216, to generate a second calibration value, is overlaid to the reference line 216. The second calibration value can also be referred to as reference value. The summing up of the signal of the perfusion measurement is also indicated with a symbol Σ next to the second arrow 218.

The first calibration value and the second calibration value can then be basis for calibration calculations.

FIG. 4a and FIG. 4b show an illustration of an example of a DSA MIP calibration using an optically measured blood content provided in a blood content image, i.e. the second image data, as imaged in an (approximately) orthogonal viewing direction. Having localized the sole 204, a DSA MIP of the foot 202 with perfused tissue 208 in FIG. 4b, the calibration region 210 is defined by growing the sole 204 surface into the foot by ~2 mm (optical penetration length). Using the measured/estimated spatial correspondences between the DSA MIP and e.g. an iPPG map, pairs of references values and corresponding DSA MIP values can be derived as follows: For a given position on the sole 204, a DSA MIP signal is summed up in orthogonal direction to the sole. By tracing "the" X-ray corresponding to this position on the sole and projecting it into the iPPG map, the corresponding reference value is obtained by summing up the optically measured blood content along this direction. These (DSA MIP, reference) value pairs are then used for fitting a calibration model.

The reference value can also be referred to as second image data reference value or perfusion measurement reference value.

Figure 5A:
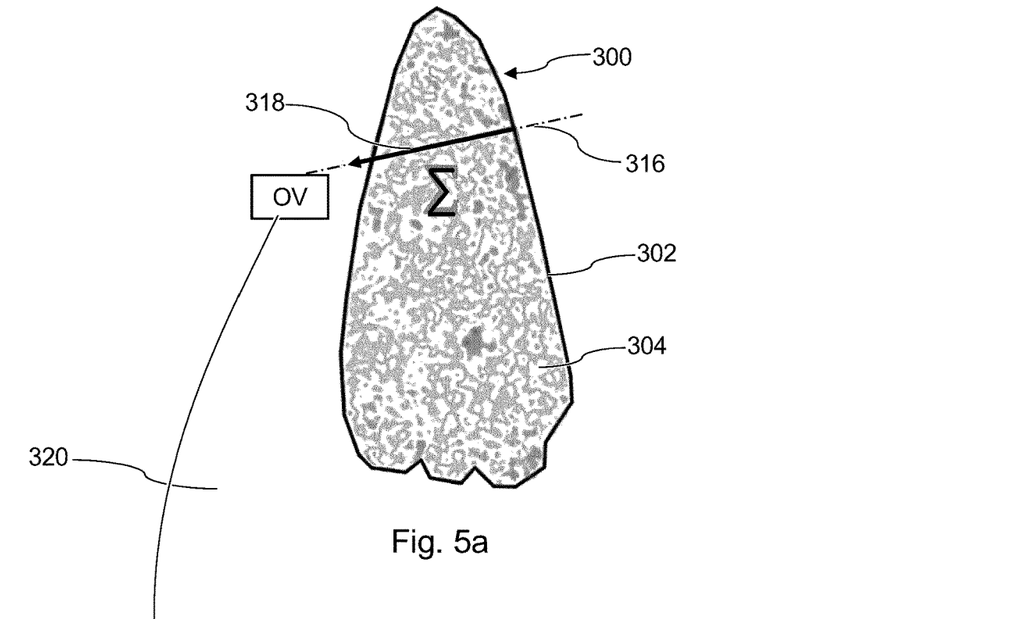
FIG. 5a and FIG. 5b show a second example of perfusion analysis yielding an enriched angiography.

FIG. 5a shows an example of an illustration of 2D optical perfusion measurement image data 300, as second image data, of a surface layer of a region of interest of the subject, for example of a foot 302. In the example, a sole 304 of the foot 302 is schematically shown. The second image data, i.e. the 2D optical perfusion measurement image data 300, comprises information about blood related properties of blood present within the surface layer of the flat part of the region of interest.

Figure 5B:
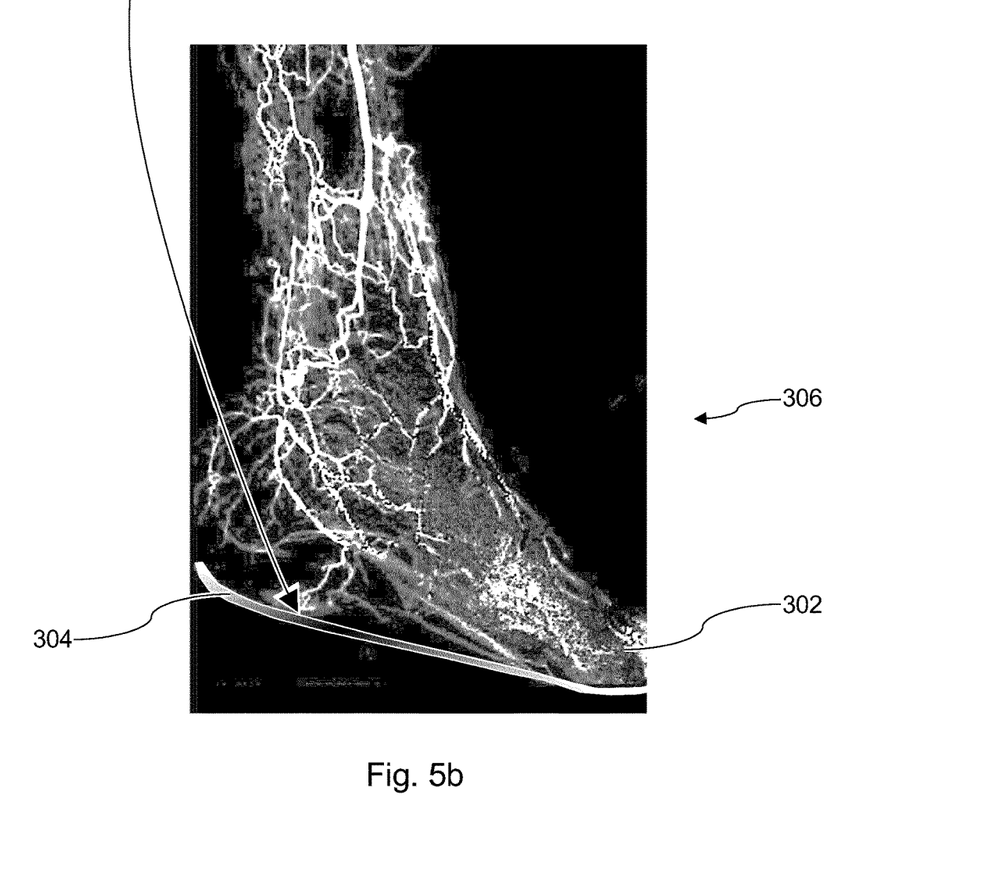

FIG. 5b shows an example of an illustration of 2D angiographic image data 306, as first image data, of the region of interest of the subject, for example of the foot 302. In the example, a side view of the foot 302 is schematically shown, with the sole 304 being arranged in the lower left section. The first image data, i.e. the 2D angiographic image data 306, comprises information about a distribution of contrast agent in tissue areas 308 of the region of interest, e.g, the foot 302, the distribution of contrast agent being indicative for perfusion.

An enrichment location is chosen, i.e. determined, in the first image data, i.e. in the 2D angiographic image data 306. The enrichment location is chosen to be arranged within the surface layer that is also shown in the 2D optical perfusion measurement image data 300, i.e. in the second image data. In FIG. 5b, the enrichment location is arranged in the sole 304. The enrichment location is thus chosen as the reference location within the identified flat part in the first image data; the enrichment location can also be referred to as a calibration location.

The enrichment location is then projected from the 2D angiographic image data 306, i.e. from the first image data, into the 2D optical perfusion measurement image data 300, i.e. into the second image data, identifying a corresponding reference line 316 within the second image data. For projection, a path of an X-ray radiation for the reference location in the first image data is traced and projected into the second image data as the corresponding reference line.

A third arrow 318, indicating a summing up of a signal of the perfusion measurement for the identified reference line 316, to generate a blood content value, is overlaid to the reference line 316. The summing up of the signal of the perfusion measurement is also indicated with a symbol Σ next to the third arrow 318. As indicated with a transfer arrow 320, the blood content value is overlaid to the first image data, e.g. as a color coded line provided in the location of the sole 304. Thus, a sole index is provided.

FIG. 5a and FIG. 5b show an example of enriching angiography (DSA MIP) by oxygenation prediction on the sole surface using optical measurements. As an example, a mean oxygenation value, OV, is determined in the 2D optical perfusion measurement image 300 along a direction, e.g, the reference line 316. This is transferred, as indicated, from the 2D optical perfusion measurement 300 to 2D angiographic image data 306 of the foot 302 providing the sole index.

Referring back to FIG. 3, in an example of the method 100, the reference location within the identified flat part in the first image data is a calibration location. It is provided the steps of:
  summing up the maximum intensity projection of the angiographic image data for the calibration location in the first image data, generating a first calibration value; and summing up the signal of the perfusion measurement for the identified reference line, generating a second calibration value. The first and second calibration values are provided for calibrating the first image data. As an option, the perfusion parameter is provided as at least one of the group of blood-volume and the hemoglobin content.

The calibration location can also be referred to as calibration region.

The reference line can also be referred to as calibration line.

The first calibration value can also be referred to as angiographic calibration value. The second calibration value can also be referred to as perfusion measurement calibration value.

As an effect, calibration of digital-subtraction angiography by surface blood content is provided.

In an example, calibration of the maximum intensity projected angiogram to absolute values is provided by estimating the blood content from the optical measurement.

The term projected angiogram relates to projection over time axis.

In an example of the method 100, the region of interest is a foot and the flat part of the region of interest is the sole; and wherein it is provided the steps of:
  localizing the sole in the angiography; and
  determining the calibration region as a thin layer in the foot. The thickness of this layer corresponds to a penetration depth of the optical imaging.

It is further provided the steps of:
  summing up the DSA MIP signal in the calibration region in the viewing direction of the optical imaging system projected to the first image data via ray-tracing; and
  assigning the result to the corresponding sole surface pixel.

In an example, to localize in the angiography e.g. a (foot) template is used with matching and edge detection or a convolutional neural network.

In an example, the calibration region is determined as a thin layer in the foot by e.g. morphological operations (unidirectional region growing).

In an example, a penetration depth of 2 mm is provided using structured light.

Depending on the concrete realizations, different optically measured parameters may serve as a reference-input for the calibration:

If structured light is used in combination with hyperspectral PPG imaging, the light scatter can be quantified in absolute units. In combination with the depth-resolution that can be achieved by structured light, the blood-volume/total hemoglobin content can be reconstructed in absolute units and serve as a reference for the angiography MIP calibration.

In the absence of structured light, the scatter may only be quantified in relative units resulting in an estimate for the blood-volume/total hemoglobin content in arbitrary units. In this situation, one may proceed as follows:
  Using this estimate in arbitrary units as a reference, the angiography MIP can be calibrated for the same patient, e.g. in pre- and post-intervention exams. Using this reference for the calibration might still be useful in order harmonize the systems of units across the two modalities. Such a harmonization might be helpful when quantitatively correlating optically measured parameters with measurements of the angiography.
  A rough estimate for the blood-volume/total hemoglobin content may be provided by utilizing estimates for the penetration depth of the hyperspectral imaging wavelengths as well as estimates for their typical scattering behavior (scattering coefficients, power-law exponent interpolating between Mie and Rayleigh scattering). If the accuracy of this estimate is not sufficient, this approximation can be refined using e.g. look-up tables for these parameters in dependence of e.g, the sex, age and skin type.
  The hyperspectral iPPG prediction for the blood-volume/total hemoglobin content may be calibrated to absolute units using an independent measurement for the same patient. Such a calibration can by re-used multiple times (e.g. for both pre- and post-intervention exams) as long as the scattering behavior is not significantly changed due to aging. The thereby calibrated blood-volume estimate can be used to as a reference for the calibration of the angiography MIP.

In an example, in order to establish spatial correspondences between the reference signal and the angiography, the local X-ray beam direction is determined for all positions on the sole (leveraging the known pose relationship in the stereo-setup, see FIG. 4a and FIG. 4b). The reference signal is then summed-up along these local directions (e.g. by neglecting the skin curvature in a first approximation) and mapped to the corresponding pixel in the angiography.

Since both the DSA MIP and the reference signal depend proportionally on the actual blood-volume to good approximation, in an example, a linear model is used for the calibration of the DSA. This model is adapted in at least two ways:
  The DSA MIP and reference signal values of calibration pixels (i.e. either sole pixels or all pixels in the calibration region) are used in a linear regression for determining the model parameters.
  By sliding over a small set of neighboring calibration pixels and performing a linear regression on their MIP, reference signal pairs, many calibration models are trained. The global calibration model is then determined by averaging the individual model parameters.

The resulting model can then be applied for calibrating the whole DSA MIP, i.e. not only the surface region of the sole. Moreover, the linear regression error or the variance in the model parameters can be used to estimate error bars for the calibration. The calibrated DSA MIP (and its error bars if desired) can be visualized e.g. as an overlay on angiography and stored for further analyses relying on calibrated DSA signals.

In a first option, structured light is provided. Structured light offers the possibility to measure the blood content/total hemoglobin in depth resolved manner (within the ~2 mm of penetration depth). This layer of tissue corresponds to about 2-4 pixels in a typical angiography (being acquired in an approximately orthogonal view). Whether this depth-resolved optical measurement can be leveraged for the calibration depends on whether spatial correspondences between the depth resolved iPPG map and the angiography can be robustly established on the length scale of the depth-resolution of the optical measurement. The latter depends on:
- the accuracy with which the mutual viewing directions and detector positions of both modalities are known/measured by sensors/estimated from the acquired images;
- the spatial stability of the angiography frames and corresponding DSA signal (depending on the accuracy of the motion compensation).

If such a spatial correspondence can be established, the reference signal in e.g. epidermis and dermis can be paired with the corresponding DSA MIP values in the angiography and used for the calibration. Such a refinement however is only meaningful if the typical change of both the reference and DSA MIP signal between the epidermis and dermis can be resolved by both modalities within the respective error bars (e.g. drifts in the angiography detector may compromise the DSA signal stability such that small changes of the DSA MIP between a "epidermis" and "dermis pixel" might not be resolved).

In a second option, smaller vessels (capillaries) and bigger vessels feature different hematocrit values. The proposed calibration can account for these differences by:
- assuming that only capillaries contribute to the DSA MIP signal in the calibration region (or estimating the typical density ratio of capillaries and bigger vessels in this regions);
- estimating the linear calibration model in the calibration region as described above;
- separating the DSA MIP into micro- and macro-vascular contributions;
- splitting the calibration model of the calibration region into individual calibration models for the micro- and the macrovascular components by reweighting with corresponding compensation factors for the hematocrit differences to the calibration region; and
- calibrating the micro- and the macrovascular components of the DSA MIP with the respective calibration model.

In a further example, the proposed calibration is further refined by locally estimating the vessel diameter in the macrovascular component of the DSA MIP and thereby adapting the hematocrit value locally. Other confounding factors such as smoking, sex or presence of ischemia can impact the hematocrit value, too, and could potentially be integrated in an even more refined calibration model.

In a third option, the calibration is refined by using multiple angiography sequences (acquired with the same injection protocol) acquired from different views. Thereby, more summation directions of the DSA MIP and the reference signal can be taken into account and, as a consequence, more (DSA MIP, reference) signal pairs enter the estimation of the calibration model, rendering it more robust.

In an example of the method, the reference location within the identified flat part in the first image data is an enrichment location. It is provided the steps of:
- summing up the signal of the perfusion measurement for the identified reference line, generating a blood content value; and
- overlaying the blood content value to the first image data.

In an example of the method, the region of interest is a foot and the flat part of the region of interest is the sole. It is provided the steps of:
- identifying the sole in the angiography;
- estimating, for each position on the sole, the corresponding ray of the X-ray beam;
- using the mutual pose estimation of both modalities, projecting this ray on a spectral map of the sole;
- reconstructing the oxygenation from the hyperspectral iPPG map;
- generating a predetermined type of an oxygenation value along this projected X-ray;
- assigning the resulting oxygenation value to the considered position of the sole in the angiography;
- mapping the oxygenation measurement into the angiography; and
- presenting the oxygenation measurement as an overlay on the DSA frames or the DSA MIP.

In an example it is provided that the projecting of the ray on the hyperspectral iPPG map of the sole is neglecting the foot curvature.

The averaging of the oxygenation along this projected X-ray is also shown in subplot in FIG. 5a.

In an example of the method, for registering the first image data and the second image data, it is provided to track a relative spatial position and relative orientation of the angiography imaging device and the optical perfusion measurement device.

As an effect, advanced perfusion analysis is provided by linking surface blood-oxygenation with blood proliferation from deeper tissue layers.

The different penetration depths and viewing directions of the modalities involved in the proposed stereo-imaging can be utilized to gain analytical insights which cannot be obtained from either modality alone. One aspect of judging perfusion is to assess the proliferation of oxygenation. While angiographies are good at measuring the distribution of blood in the whole foot, hyperspectral iPPG measurements allow for estimating the oxygenation degree close to the skin surface.

Using the proposed stereo-imaging set-up, these complementary pieces of information can be combined as similarly to the construction of the (DSA MIP, reference) signal pairs in the calibration option above (see FIGS. 4a and 4b; FIGS. 5a and 5b).

By correlating the spatial distribution of blood in the food (as indicated by the DSA MIP) and the spatial distribution of oxygenation on the sole either visually or via statistical analysis, clinically relevant points may be addressed such as:
i) Does the oxygenation increase (roughly) proportionally to the increased blood supply after an intervention? If not, this finding is an indication for improving blood transport being potentially insufficient for a positive overall treatment outcome.
ii) A wound area, localized in iPPG map, and the oxygenation distribution in the wound area as well as its vicinity can be mapped into the angiography. Thereby, the enriched DSA MIP might be employed to judge the blood supply of the wound area from deeper layers, to correlate the blood content in deeper layers of the wound to its oxygenation at the surface and potentially to give a prognosis for the healing process (based on cohort of patients with known outcome).

iii) The hyperspectral iPPG measurements could probably differentiate between perfused wounds which are hypoxic (e.g. due to infections) and non-perfused regions at the surface. The angiography can maybe support these indications by confirming the lack of perfusion also in deeper layers or identify these indications as an artefact only measured at the surface.

In some clinical situations like arteriovenous (AV) shunting the perfusion in the dermal layer may be intact but the microvascular bed is shunted off from blood supply and thus oxygenation, and therefore might become hypoxic. This has to be accounted for when correlating deeper and superficial blood content with oxygenation. SLI offers the possibility to selectively estimate the oxygenation of either the dermal layer or the microvascular bed. Depending on the indication, one can thus map the oxygenation values of either the microvascular bed or the dermal layer or an average over both into the sole surface pixels of the angiography and correlate these values with the perfusion properties of deeper layers.

In a further embodiment, not the oxygenation is mapped into the angiography but the oxygenated blood content (if this is predicted from the hyperspectral iPPG signal using structured light). In this case, oxygenated blood content should be summed up along the X-ray direction projected onto the sole (instead of taking the average).

In an example of the method, the first image data is acquired in a first direction in relation to the region of interest, and the second image data is acquired in a second direction in relation to the region of interest. The first and the second direction are approximately orthogonal to each other.

The term "approximately orthogonal" relates to a 90° arrangement of the first and second viewing direction with a deviation of up to +/−30°, e.g. up to +/−20°, or up to +/−10°. In an example, a deviation of up to +/−5° is provided. In a further example, an arrangement of 90° is provided.

The X-ray image and the optical image are hence arranged in a perpendicular manner.

The so-to-speak stereo-imaging configuration involving both modalities overcomes shortcomings of angiographies via image processing which is configured by optical perfusion measurements on the skin surface. Thus, angiographic and optical perfusion methods are combined in a complementary way.

In an example, both optical perfusion measurements, e.g. hyper/multispectral iPPG with structured light, and angiography sequences are acquired from approximately orthogonal views. In a further example, if e.g. cuff or other stimuli are applied, measurements are synchronized.

In an example, in order to establish (approximate) spatial correspondences between the modalities, the imaging geometry (relative positioning of modalities and subject's anatomy like a foot) must be known or reconstructed. In an example, the relative positions of both imaging devices are measured via sensors (e.g. [depth-]camera, Wi-Fi, radar). In one example, a ceiling mounted camera senses the position of markers attached to the gantry and the optical imaging system in cathlab coordinates. In another embodiment, at least two angiography sequences are acquired from different views. Utilizing the known change in the C-arm positioning (e.g. encoded in the DICOM metadata), the accuracy of the pose-estimation of angiography based on the acquired images can be enhanced.

In an example, as an alternative to sensors, pose-estimation algorithms are applied to both the angiography and optically acquired images. In an example, for the angiography, a neural-network based matching of an articulated foot-model to the X-ray image is used. The pose of the optical imaging system is estimated using the acquired RGB or grey-level signal. This is accomplished by using triangulation approaches with a second camera or projection device, e.g. light spatially structured in the plane orthogonal to its propagation direction.

In an example of the method, the region of interest of the subject belongs to at least a foot or a hand of a subject. The flat part of the region of interest is chosen as one of the group of: sole of foot, palm of the hand and dorsum of the hand.

In an example, a lateral angiography view of a foot and an optical measurement of the sole of the foot is provided.

In further examples, other scenarios are provided, like a lateral angiography view of a hand and an optical measurement of the palm of the hand or the dorsum of the hand sole.

In an example of the method, a skin oxygenation estimate, obtained from the optical measurement, is mapped into the 2D angiographic image data. The skin oxygenation estimate is correlated with the perfusion in the depth.

As an example, this enables e.g. an in-depth analysis of wounds.

In an example, quantitative intra- and interpatient comparisons are facilitated.

In an example, the intra- and interpatient comparisons are impeded by many confounding factors in angiography analysis, e.g. details of the contrast medium injection protocol.

As explained above, an optical perfusion-measurement driven angiography processing is provided.

Optical perfusion measurements on the skin surface are utilized for advanced image processing of 2D angiographies. In an example, the image processing involves enhancing the angiography by information being inaccessible in angiographic imaging, calibration or image quality improvements. According to an example, the complementary properties of optical and angiographic perfusion measurements and are leveraged and up to a certain degree the limitations of one modality is overcome by using the other modality.

Digital subtraction angiography (DSA) provides a look at the global perfusion. DSA can provide a 2D projection of the vascular system where injected contrast fluid flows through the artery and veins. Stenoses due to calcified arteries or compressed veins, thrombosis etc. can be readily visualized at the cost of radiation and contrast. The use of optical perfusion measurements for configuring the image processing of an angiography provides that certain shortcomings of angiographies can be overcome.

As an example, the estimation of the absolute blood content in surface layers via optical measurements is used for calibrating the DSA MIP. This overcomes the lack of absolute or at least standardized units of the perfusion signal in angiographies, specifically the DSA MIP. The oxygenation estimate in surface layers via optical measurements can be mapped into an angiography. This overcomes the lack of chemical specificity of angiographies.

In an example, the optical measurements are assumed to be performed as a combination of photoplethysmogram imaging (iPPG), multi-spectral imaging (MSI) and structured light imaging (SLI) for the sake of the following overview:

For example, optical perfusion measurements have the advantages:
  chemical sensitivity (oxygenation etc.);
  penetration depth of about 2 mm;
  typical view is the sole or en-face view providing surface imaging;
  sensitivity to microvascular perfusion;
  at least a certain sensitivity to macrovascular perfusion for the surface plexi and veins;
  observable in absolute units, wherein oxygen saturation is provided; further, SLI can facilitate blood-volume-content measurements;
  regarding the workflow, the device is an additional device with a typically minimal invasive form factor;
  radiation dose is minimum due to purely optical measurement;
  contrast agent is not required; and
  the frame rate may be around 24 frames per second (fps).

For example, angiographies have the advantages:
  penetration depth of more than 10 cm;
  typical view is the lateral view with a volume projection;
  typical field-of-view size is global;
  sensitivity to microvascular perfusion; due to stability restrictions, no precise localization due to projection and superposition effects;
  sensitivity to macrovascular perfusion;
  regarding the workflow, the device is always an available part of the workflow; and
  the frame rate may be around three frames per second (fps).

The digital-subtraction angiography (DSA) signal depends quantitatively on details of the injection protocol and other confounding factors. This holds also for derived signals such as the maximum-intensity projection (MIP) with respect to time. The MIP DSA provides valuable information about how well certain areas in the foot are perfused. Under the assumption that the contrast medium has the same relative concentration with respect to the local blood volume everywhere, the DSA MIP may be used to give a relative quantification of the perfusion intensities of different areas in the same angiography sequence. The assumption holds well for the vasculature of healthy patients where, however, the hematocrit differs between the micro- and macro-vasculature. Inflammation, cancer and other pathologies, however, may result in an extra-vasculature perfusion and a partial absorption/metabolization of the contrast agent.

Yet a quantitative comparison of the absolute DSA MIP signal between different angiographies of the same patient or patients in a cohort is compromised by its dependence on the injection protocol and other confounding factors, which hinders to directly use it as an input for e.g. outcome prediction of an intervention.

The present invention overcomes this weakness of the DSA MIP by a dedicated calibration scheme based on optical perfusion measurements.

The solution can be used in, for example, minimally invasive perfusion monitoring. An example of application of the present solution is perfusion monitoring in patients suffering from peripheral vascular disease.

The term "subject" may also be referred to as individual. The "subject" may further also be referred to as patient, although it is noted that this term does not indicate whether any illness or disease is actually present with the subject.

In an example, a computer program or program element for controlling an apparatus according to one of the examples above is provided, which program or program element, when being executed by a processing unit, is adapted to perform the method steps of one of the method examples above.

The computer program element might therefore be stored on a computer unit or be distributed over more than one computer units, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

As discussed above, the processing unit, for instance a controller implements the control method. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section. A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A device for perfusion analysis, the device comprising:
a processor configured to:
obtain X-ray based 2D angiographic image data as first image data of a region of interest of a subject; wherein the first image data comprises information about a distribution of contrast agent in tissue areas of the region of interest being indicative for perfusion;
obtain 2D optical perfusion measurement image data as second image data of a surface layer of a flat part of the region of interest of the subject; wherein the second image data comprises information about blood related properties of blood present within the surface layer of the flat part of the region of interest;
register the first image data and the second image data;
transfer perfusion related image content from the second image data to the first image data, generating enhanced first image data; and
provide the enhanced first image data.

2. The device according to claim 1, further comprising a display configured to display the enhanced first image data.

3. The device according to claim 1, wherein the second image data is image data of a surface layer of a flat part of the region of interest; and the processor is further configured to:
identify the flat part of the region of interest in the first image data;
determine a reference location within the identified flat part in the first image data;
project the reference location from the first image data into the second image data identifying a corresponding reference line within the second image data; wherein, for the projection, a path of an X-ray radiation for the reference location in the first image data is traced and projected into the second image data as the corresponding reference line;
determine image values along the corresponding reference line within the second image data, to generate a reference value; and
transfer the reference value to the reference location within the identified flat part in the first image data.

4. The device according to claim 3, wherein the reference location within the identified flat part in the first image data is a calibration location; and the processor is further configured to:
sum up a maximum intensity projection (DSA MIP) of the angiographic image data for the calibration location in the first image data, to generate a first calibration value;
sum up the signal of the perfusion measurement for the identified reference line, to generate a second calibration value;
wherein the first and second calibration values are provided for calibration of the first image data; and
wherein the perfusion parameter is provided as at least one of the group of blood-volume and hemoglobin content.

5. The device according to claim 4, wherein the region of interest is a foot and the flat part of the region of interest is the sole; and the processor is further configured to:
localize the sole in the angiography;
determine a calibration region as a thin layer in the foot;
wherein the thickness of this layer corresponds to a penetration depth of the optical imaging;
sum up the DSA MIP signal in the calibration region in the viewing direction of the optical imaging system projected to the first image data via ray-tracing; and
assign the result to the corresponding sole surface pixel.

6. The device according to claim 1, wherein the reference location within the identified flat part in the first image data is an enrichment location; and the processor is further configured to:
sum up the signal of the perfusion measurement for the identified reference line, to generate a blood content value; and
overlay the blood content value to the first image data.

7. The device according to claim 4, wherein the region of interest is a foot and the flat part of the region of interest is the sole; and the processor is further configured to:
identify the sole in the angiography;
estimate, for each position on the sole, the corresponding ray of the X-ray beam;
use the mutual pose estimation of both modalities, to project this ray on a spectral map of the sole;
reconstruct the oxygenation from the spectral map;
generate a predetermined type of an oxygenation value along this projected X-ray;
assign the resulting oxygenation value to the considered position of the sole in the angiography;
map the oxygenation measurement into the angiography; and
present the oxygenation measurement as an overlay on the DSA frames or the DSA MIP.

8. The device according to claim 1, wherein for registration of the first image data and the second image data, and the processor is further configured to provide to track a relative spatial position and relative orientation of the angiography imaging device and the optical perfusion measurement device.

9. The device according to claim 1, wherein the first image data is acquired in a first direction in relation to the region of interest; and the second image data is acquired in a second direction in relation to the region of interest; and
wherein the first and the second direction are approximately orthogonal to each other.

10. The device according to claim 1, wherein the region of interest of the subject belongs to at least a foot or a hand of a subject; and
wherein the processor is further configured to choose the flat part of the region of interest as one of the group of: sole of foot, palm of the hand and dorsum of the hand.

11. The device according to claim 1, wherein the processor is further configured to:
map a skin oxygenation estimate, obtained from the optical measurement, into the 2D angiographic image data; and
correlate the skin oxygenation estimate with the perfusion in the depth.

12. A medical imaging system comprising:
an angiography imaging device configured for generation of X-ray images of a region of interest of a subject, wherein the X-ray images comprise contrast-injected images and non-injected images; and/or
an optical perfusion measurement device configured for generation of optical perfusion measurements of the region of interest of the subject;
the device for perfusion analysis according to claim 1;
wherein the X-ray imaging device is configured to acquire X-ray images for generating the X-ray based 2D angiographic image data; and
wherein the optical perfusion imaging device is configured to acquire images for generating the 2D optical perfusion measurement image data.

13. A method for perfusion analysis, the method comprising:
providing X-ray based 2D angiographic image data as first image data of a region of interest of a subject; wherein the first image data comprises information about a distribution of contrast agent in tissue areas of the region of interest being indicative for perfusion;
providing 2D optical perfusion measurement image data as second image data of a surface layer of a flat part of the region of interest of the subject; wherein the second image data comprises information about blood related properties of blood present within the surface layer of the flat part of the region of interest;
registering the first image data and the second image data; and
transferring perfusion related image content from the second image data to the first image data, generating enhanced first image data.

14. The method according to claim 13, wherein the second image data is image data of a surface layer of a flat part of the region of interest; and the method further comprises:
identifying the flat part of the region of interest in the first image data;
determining a reference location within the identified flat part in the first image data;
projecting the reference location from the first image data into the second image data identifying a corresponding reference line within the second image data; wherein, for the projection, a path of an X-ray radiation for the reference location in the first image data is traced and projected into the second image data as the corresponding reference line;
determining image values along the corresponding reference line within the second image data, to generate a reference value; and
transferring the reference value to the reference location within the identified flat part in the first image data.

15. The method according to claim 14, wherein the reference location within the identified flat part in the first image data is a calibration location; and the method further comprises:
summing up a maximum intensity projection (DSA MIP) of the angiographic image data for the calibration location in the first image data, to generate a first calibration value;
summing up the signal of the perfusion measurement for the identified reference line, to generate a second calibration value;
wherein the first and second calibration values are provided for calibration of the first image data; and
wherein the perfusion parameter is provided as at least one of the group of blood-volume and hemoglobin content.

16. The method according to claim 15, wherein the region of interest is a foot and the flat part of the region of interest is the sole; and the method further comprises:
localizing the sole in the angiography;
determining a calibration region as a thin layer in the foot, wherein the thickness of this layer corresponds to a penetration depth of the optical imaging;
summing up the DSA MIP signal in the calibration region in the viewing direction of the optical imaging system projected to the first image data via ray-tracing; and
assigning the result to the corresponding sole surface pixel.

17. A non-transitory computer readable storage medium having stored a computer program comprising instructions which, when executed by a processor, cause the processor to:
obtain X-ray based 2D angiographic image data as first image data of a region of interest of a subject; wherein the first image data comprises information about a distribution of contrast agent in tissue areas of the region of interest being indicative for perfusion;
obtain 2D optical perfusion measurement image data as second image data of a surface layer of a flat part of the region of interest of the subject; wherein the second image data comprises information about blood related properties of blood present within the surface layer of the flat part of the region of interest;
register the first image data and the second image data;
transfer perfusion related image content from the second image data to the first image data, generating enhanced first image data; and
provide the enhanced first image data.

18. The non-transitory computer readable storage medium according to claim 17, wherein the second image data is image data of a surface layer of a flat part of the region of interest; and the instructions, when executed by the processor, further cause the processor to:
identify the flat part of the region of interest in the first image data;
determine a reference location within the identified flat part in the first image data;
project the reference location from the first image data into the second image data identifying a corresponding reference line within the second image data; wherein, for the projection, a path of an X-ray radiation for the reference location in the first image data is traced and projected into the second image data as the corresponding reference line;

determine image values along the corresponding reference line within the second image data, to generate a reference value; and transfer the reference value to the reference location within the identified flat part in the first image data.

19. The non-transitory computer readable storage medium according to claim 18, wherein the reference location within the identified flat part in the first image data is a calibration location; and the instructions, when executed by the processor, further cause the processor to:

sum up a maximum intensity projection (DSA MIP) of the angiographic image data for the calibration location in the first image data, to generate a first calibration value;

sum up the signal of the perfusion measurement for the identified reference line, to generate a second calibration value;

wherein the first and second calibration values are provided for calibration of the first image data; and wherein the perfusion parameter is provided as at least one of the group of blood-volume and hemoglobin content.

20. The non-transitory computer readable storage medium according to claim 19, wherein the region of interest is a foot and the flat part of the region of interest is the sole; and the instructions, when executed by the processor, further cause the processor to:

localize the sole in the angiography;

determine a calibration region as a thin layer in the foot, wherein the thickness of this layer corresponds to a penetration depth of the optical imaging;

sum up the DSA MIP signal in the calibration region in the viewing direction of the optical imaging system projected to the first image data via ray-tracing; and assign the result to the corresponding sole surface pixel.

* * * * *